US008391502B2

(12) United States Patent
Mizoguchi et al.

(10) Patent No.: US 8,391,502 B2
(45) Date of Patent: Mar. 5, 2013

(54) SOUND REPRODUCING APPARATUS AND AUDIOVISUAL SYSTEM

(75) Inventors: Masahiko Mizoguchi, Osaka (JP); Toshiki Murakami, Osaka (JP); Akifumi Sakamoto, Osaka (JP); Akihiro Mitani, Osaka (JP); Yoshifumi Inoue, Osaka (JP); Koichi Otsuka, Osaka (JP)

(73) Assignee: Panasonic Corporation, Osaka (JP)

( * ) Notice: Subject to any disclaimer, the term of this patent is extended or adjusted under 35 U.S.C. 154(b) by 1098 days.

(21) Appl. No.: 12/090,997

(22) PCT Filed: Oct. 31, 2006

(86) PCT No.: PCT/JP2006/321716
§ 371 (c)(1),
(2), (4) Date: Apr. 21, 2008

(87) PCT Pub. No.: WO2007/052637
PCT Pub. Date: May 10, 2007

(65) Prior Publication Data
US 2009/0284665 A1    Nov. 19, 2009

(30) Foreign Application Priority Data
Oct. 31, 2005    (JP) ................................ 2005-316145

(51) Int. Cl.
H04R 29/00    (2006.01)
(52) U.S. Cl. .......................................... 381/58; 381/306
(58) Field of Classification Search .................... 381/58, 381/306
See application file for complete search history.

(56) References Cited

U.S. PATENT DOCUMENTS

| 2002/0131611 | A1* | 9/2002 | Hoover et al. ................ 381/123 |
| 2003/0185400 | A1* | 10/2003 | Yoshizawa et al. ............. 381/58 |
| 2003/0214507 | A1 | 11/2003 | Mawatari |
| 2004/0125953 | A1 | 7/2004 | Cho |

(Continued)

FOREIGN PATENT DOCUMENTS

| JP | 5-153520 | 6/1993 |
| JP | 2001-195341 | 7/2001 |

(Continued)

OTHER PUBLICATIONS

International Search Report dated Dec. 5, 2006.

(Continued)

*Primary Examiner* — Brian Pendleton
*Assistant Examiner* — Olugbenga Idowu
(74) *Attorney, Agent, or Firm* — Dickinson Wright PLLC (57) ABSTRACT

In an audiovisual system in which a source device and a television are connected via an AV amplifier, even when the AV amplifier is placed in a "Power Supply Standby State", video/audio signals outputted from the source device can be viewed/listened to on the television without changing the wiring connections between the devices.

An AV amplifier (100) is provided with a data storing means (106) used for indicating a signal reproduction ability to a source device (200). During a "Power Supply Standby State" of the AV amplifier (100), the content of data that is saved in the data storing means (106) and indicates an audio signal reproduction ability is rewritten into data that indicates not the reproduction ability of the AV amplifier (100), but the signal reproduction ability of a television (300), thereby producing a state that is equivalent to a state in which the source device (200) and the television (300) are directly connected.

2 Claims, 6 Drawing Sheets

U.S. PATENT DOCUMENTS

2004/0239816 A1* 12/2004 Ando .............................. 348/705
2005/0165967 A1   7/2005 Woolgar

FOREIGN PATENT DOCUMENTS

| JP | 2003-298975 | 10/2003 |
| JP | 2004-7389   | 1/2004  |
| JP | 2004-95159  | 3/2004  |
| JP | 2005-51547  | 2/2005  |
| JP | 2005-524926 | 8/2005  |

OTHER PUBLICATIONS

Supplementary European Search Report dated Jun. 22, 2010.
"High-Definition Multimedia Interface Specification Version 1.2," XP003017203, HDMI Licensing, LLC, Aug. 2005, p. i-xiv, p. 1-110.
Japanese Office Action dated Oct. 25, 2011.

* cited by examiner

SOUND REPRODUCING APPARATUS AND AUDIOVISUAL SYSTEM

TECHNICAL FIELD

The present invention relates to a sound reproducing apparatus that receives and sends video signals and audio signals, and furthermore reproduces audio signals. The invention also relates to an audiovisual system that includes a video/audio signal generating apparatus connected to the sound reproducing apparatus, and a video/audio output apparatus.

BACKGROUND ART

Conventionally, audiovisual systems have been proposed in which are combined a video/audio signal generating apparatus such as a player or recorder, a sound reproducing apparatus such as an AV amplifier, and a video/audio output apparatus such as a television receiver. The video/audio signal generating apparatus, the sound reproducing apparatus, and the video/audio output apparatus respectively are also referred to as a source device, a repeater device, and a sink device.

An example of this sort of audiovisual system is, for example, described in Patent Document 1. In the system described in Patent Document 1, apparatuses of each of a monitor receiver, a DVD recorder, and an AV amplifier are connected with an IEEE 1394 cable, a D-terminal video cable, an analog audio cable, and an HDMI cable. Transmission of video signals and audio signals between each of these apparatuses, and also transmission of control signals, is performed with these cables. In the same system, when an HDMI-compliant interface is used, the DVD recorder, in response to user operation, acquires information of a format with which the connected monitor receiver and AV amplifier are compatible, and outputs video signals and audio signals compatible with that format.

Patent Document 1: Japanese Laid-Open Patent Publication No. 2005-51547

DISCLOSURE OF THE INVENTION

Problem To be Solved by the Invention

There are various methods for viewing/listening to video and audio using an audiovisual system. For example, of the video signals and audio signals reproduced by the DVD player, video is output to a television, and audio is output by surround with external speakers connected to the AV amplifier. With this method, it is possible to view video with the television, and also enjoy powerful multi-channel sound from the external speakers connected to the AV amplifier. In this case, it is necessary that power supplies of all of the devices in the path in which reproduced signals are transmitted are turned on.

On the other hand, for example, at night or the like when it is not preferable to output audio from the external speakers at high volume, a switch is made to audio output from internal speakers of the television. When audio is not output from the external speakers, it is often the case that a function as an AV amplifier is not necessary, and operation of only the source device such as a recorder or player and the television is adequate.

However, when the power supply of the AV amplifier, which is in the path in which signals are transmitted, is turned off, signals from the source device to the television are interrupted. In order to avoid such an interruption, it is necessary to change wiring connections so that the source device and the television are directly connected, but this method is not very realistic.

As a method of connecting a source device to a television without changing the state of wiring connections between devices, it is conceivable to provide a switching switch in the AV amplifier. Specifically, a configuration is adopted in which when the power supply of the AV amplifier has been turned off with the switching switch, signals from an input terminal can be disconnected from an internal circuit of the AV amplifier, and directly output to an output terminal. With this method, the signal of the source device is transmitted to the television as-is without changing the wiring connections between devices.

However, viewed from the side of the source device, the format of the signal when output and reproduced with the AV amplifier is not necessarily the same as the format of a signal that is reproducible with the television. Accordingly, even if the switching switch is used to transmit the signal of the input terminal of the AV amplifier directly to the output terminal, normal audio is not necessarily output from the television. In order to avoid a circumstance in which abnormal audio is output from the television, it is necessary for the user to reset the source device to an optimal state, according to the apparatus that will reproduce the signal.

It is an object of the invention to provide a sound reproducing apparatus and audiovisual system in which it is possible to simply realize an optimal audio output state without making it necessary for a user to perform a setting operation of a source device when switching between a state in which audio is output from external speakers connected to an AV amplifier and a state in which audio is output from internal speakers of a television.

Means for Solving the Problem

In order to achieve the above object, a sound reproducing apparatus according to the invention is provided with:

a signal input part that inputs video signals and audio signals;

a signal output part that outputs video signals and audio signals;

a data storing means that saves data for indicating a signal reproduction ability for a device connected to the signal input part;

an audio signal output means that can output audio signals based on the reproduction ability saved in the data storing means; and a control means that writes and reads out data saved in the data storing means;

in which the control means rewrites the contents of the data saved in the data storing means in a power supply on state in which a power supply is turned on so that audio signals can be output via the audio signal output means, and in a power supply standby state in which audio signals cannot be output via the audio signal output means.

In the sound reproducing apparatus according to the invention, it is preferable that in the power supply standby state, data that indicates the reproduction ability of a device connected to the signal output part is saved in the data storing means. Also, it is preferable that the data that indicates reproduction ability and is saved in the data storing means is data that does not exceed the video signal transmission ability of the sound reproducing apparatus itself. Further, it is preferable that in the power supply on state, the data that indicates the reproduction ability of the sound reproducing apparatus itself is saved in the data storing means.

Also, it is preferable that the signal input part and the signal output part comply with HDMI (High Definition Multimedia Interface) specifications. Also, it is preferable that the data saved in the data storing means complies with EDID (Extended Display Identification Data) specifications.

Also, an audiovisual system according to the invention that achieves the above object is an audiovisual system provided with at least a video/audio signal generating apparatus that generates video signals and audio signals, a video/audio output apparatus that can output video signals and audio signals that the video/audio output apparatus generates or that have been input, a sound reproducing apparatus that is connected to the video/audio signal generating apparatus and the video/audio output apparatus and can output audio signals with an external speaker, the sound reproducing apparatus being provided with:

a signal input part that is connected to the video/audio signal generating apparatus and inputs video signals and audio signals;

a signal output part that is connected to the video/audio output apparatus and outputs video signals and audio signals;

a data storing means that saves data for indicating signal reproduction ability;

an audio signal output means that can output audio signals to the external speaker; and a control means that writes and reads out data saved in the data storing means;

in which the video/audio signal generating apparatus produces video signals and audio signals based on data related to reproduction ability that has been saved in the data storing means, and the control means, in a power supply on state in which a power supply is turned on to the sound reproducing apparatus so that audio signals can be output via the audio signal output means, saves data indicating the reproduction ability of the sound reproducing apparatus in the data storing means, and in a power supply standby state in which audio signals cannot be output via the audio signal output means, saves data that indicates the reproduction ability of the video/audio output apparatus.

It is preferable that the sound reproducing apparatus, in the power supply on state, outputs video signals that have been output by the video/audio signal generating apparatus to the video/audio output apparatus via the signal output part, and outputs audio signals that have been output by the video/audio signal generating apparatus to the external speaker.

Also, it is preferable that the sound reproducing apparatus, in the power supply standby state, outputs video signals and audio signals that have been output by the video/audio signal generating apparatus to the video/audio output apparatus via the signal input part and the signal output part.

Effect of the Invention

In the sound reproducing apparatus according to the present invention, when a power supply of the sound reproducing apparatus is in a so-called standby state, data related to reproduction of video signals and audio signals of a device connected to a signal output part of the sound reproducing apparatus is stored in a data storing means. As a result, video signals and audio signals sent out from a device connected to a signal input part are not in a format compatible with the sound reproducing apparatus, but in a format compatible with the device connected to the signal output part. Thus, when the power supply of the sound reproducing apparatus present in a signal transmission path is in a standby state, this state is equivalent to a state in which the device connected to the signal input part is directly connected to the device connected to the signal output part. As a result, it is not necessary to change the wiring connections of the audiovisual system, nor is it necessary for the user to readjust the format of the video/audio signal generating apparatus to match the video/audio output apparatus.

BEST MODE FOR CARRYING OUT THE INVENTION

Figure 1:
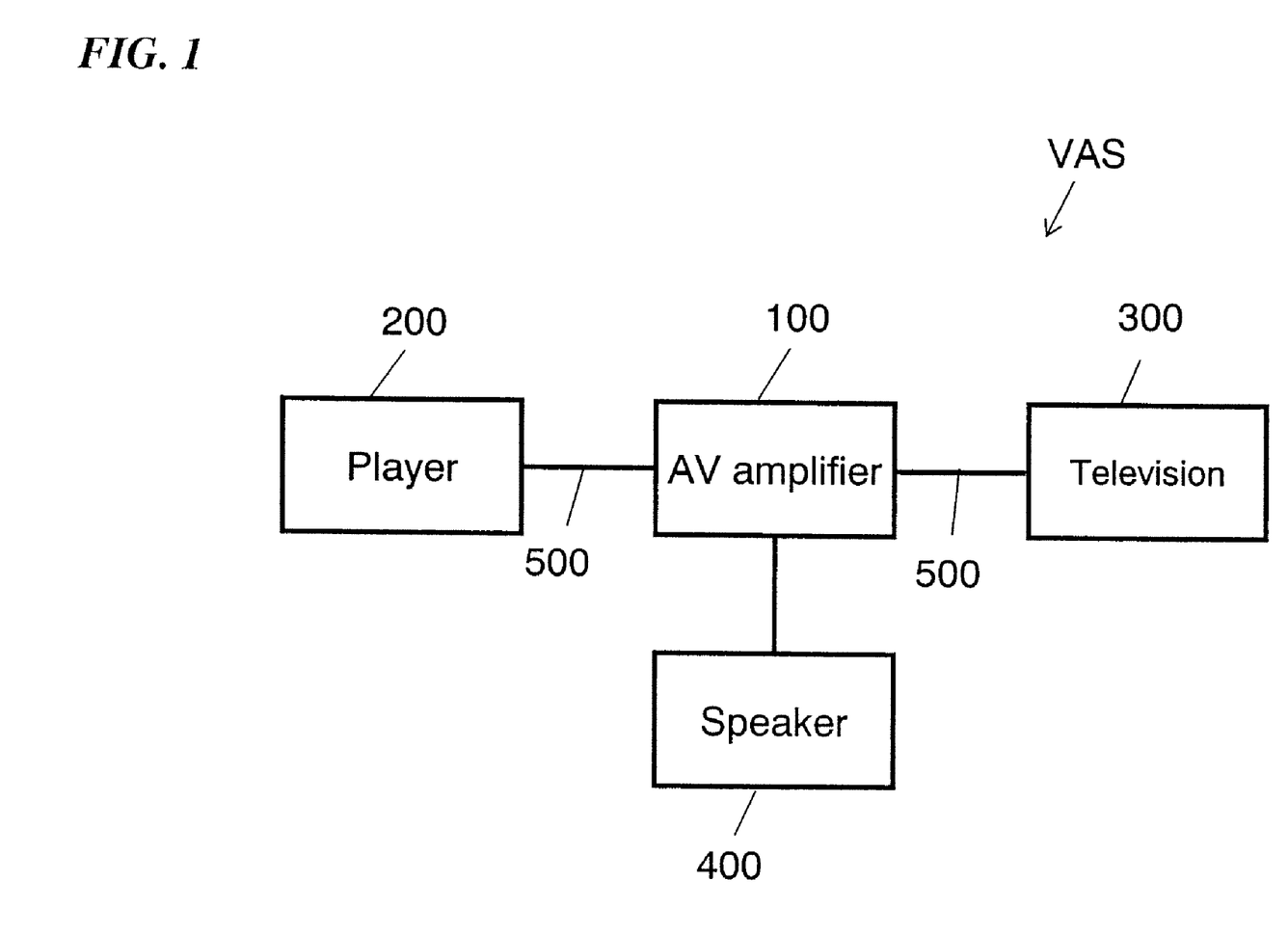
FIG. 1 is a block diagram that shows the configuration of an audiovisual system according to an embodiment of the present invention.

FIG. 1 shows the configuration of an audiovisual system VAS according to an embodiment of the present invention. This system VAS is configured with an AV amplifier 100 as a sound reproducing apparatus that outputs audio, a source device 200 such as a DVD player or DVD recorder, a television 300 having an internal speaker, and an external speaker 400 that is connected to the AV amplifier 100.

The source device 200 and the AV amplifier 100, and the AV amplifier and the television 300, are connected with a cable 500 that is compliant with the HDMI (High Definition Multimedia Interface) specification (referred to below as an HDMI cable). The HDMI cables 500 are configured with, other than signal lines that transmit video signals and audio signals, a DDC line that transmits various information, a CEC line that transmits CEC (Consumer Electronics Control) signals that are control signals between each device, and the like. In this embodiment, in FIG. 2 and subsequent drawings, other than signal lines that transmit video signals and audio signals, a DDC line is shown.

Of the video signals and audio signals sent from the source device 200, basically the video signals are resent from the AV amplifier 100 to the television 300, and output as video by the television 300. On the other hand, there may be a case in which the audio signals are processed within the AV amplifier 100, and audio is output from the external speaker 400, and there may be a case in which the audio signals are again sent to the television 300, and audio is output from the internal speaker of the television 300.

As examples of the external speaker 400, there are 5.1 channel surround speaker systems that have six speakers, and two-channel speaker apparatuses that have two speakers. The AV amplifier 100 has an audio signal output means that is compatible with the external speaker 400.

The source device 200 is an example of an apparatus that generates video signals and audio signals, such as a DVD player or DVD recorder, and may also be a video tape recorder. The television 300 is an example of a video/audio output apparatus. Other than an apparatus that has a tuner and generates video signals and audio signals, the television 300 also encompasses an apparatus that does not have a tuner, and displays video and outputs audio based on video signals and audio signals that have been input.

Following is a summary description of operation of the audiovisual system according to the present embodiment. The source device 200 refers to data, described below and saved in the data storing part of the AV amplifier 100, that indicates the reproduction ability of video signals and audio signals, and sets the format of the video signals and audio signals that will be produced. When the power supply of the AV amplifier 100 is turned on and audio is output from the external speaker 400 of the AV amplifier 100, as the data that indicates reproduction ability, data is necessary that indicates audio signal reproduction ability of the AV amplifier 100 itself. On the other hand, when the power supply of the AV amplifier 100 is turned off, placing the AV amplifier 100 in a standby state, and audio is output from the internal speaker of the television 300, as the data that indicates reproduction ability, data of the video signal and audio signal of the television 300 is necessary.

In this invention, the data that is saved in the data storing part of the AV amplifier is rewritten according to the on/off state of the power supply of the AV amplifier 100. By changing the contents of the data to which the source device refers, it is possible for the source device to output an audio signal in a format suitable to the speaker that will be used.

Figure 2:
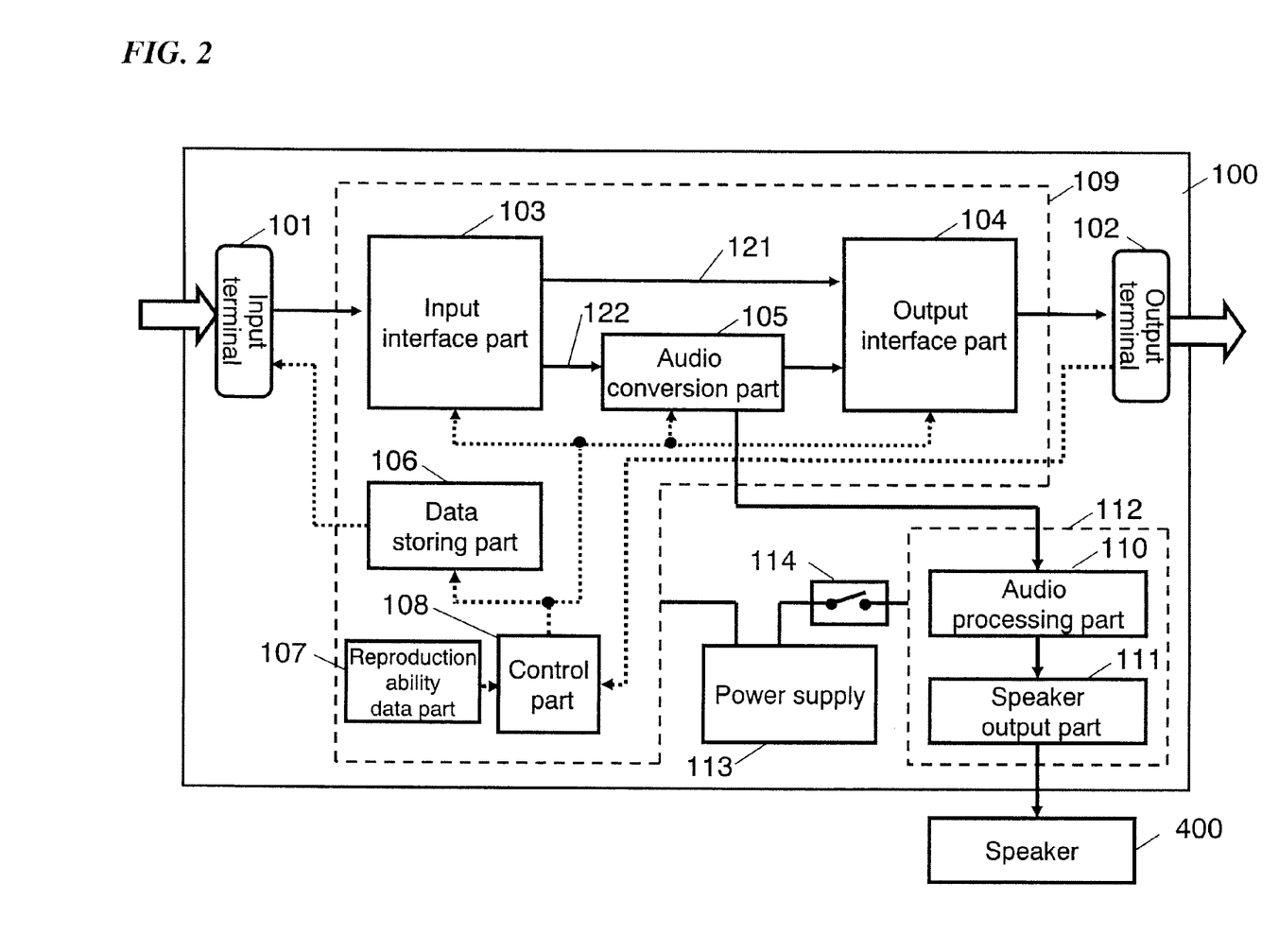
FIG. 2 is a block diagram that shows the internal configuration of an AV amplifier in FIG. 1.
Figure 3:
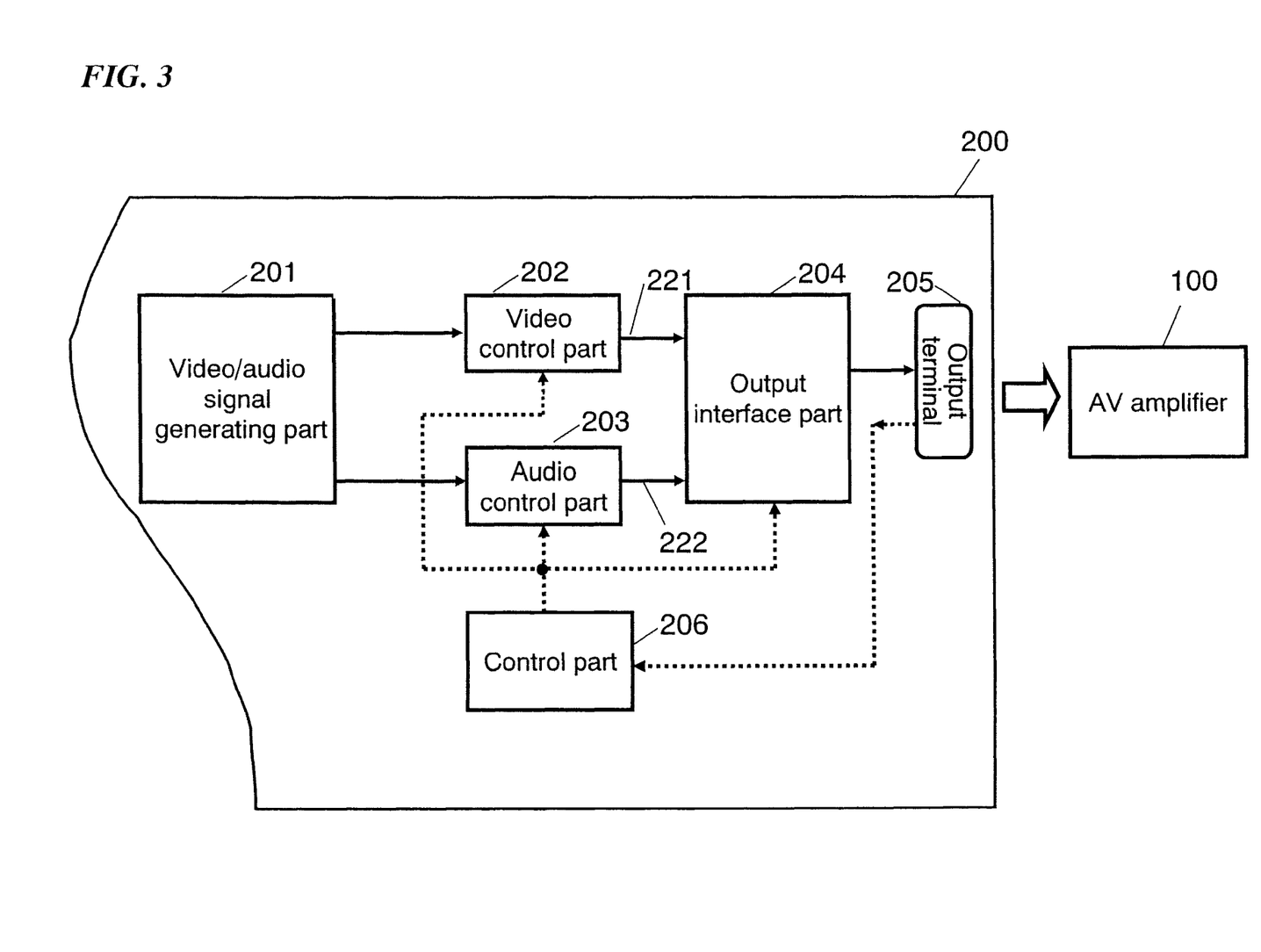
FIG. 3 is a block diagram that shows the internal configuration of a source device in FIG. 1.
Figure 4:
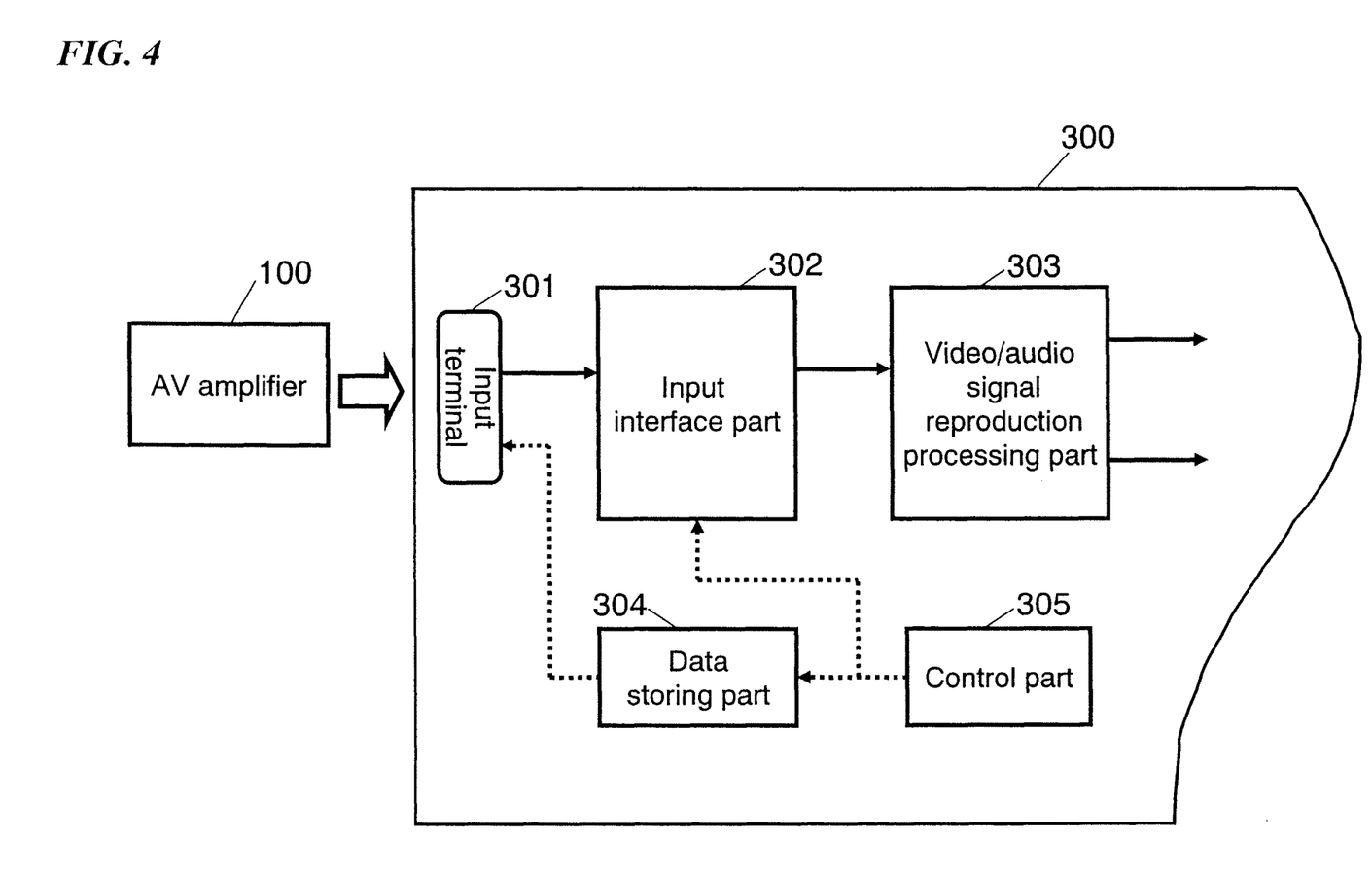
FIG. 4 is a block diagram that shows the internal configuration of a television in FIG. 1.

Next is a description of the internal configuration of the AV amplifier 100, the source device 200, and the television 300, used to configure the system VAS of the invention, with reference to FIGS. 2 to 4. FIG. 2 shows the internal configuration of the AV amplifier 100. The AV amplifier 100 is configured with an input terminal 101 and output terminal 102, an HDMI block 109, an amplifier block 112, and a power supply 113.

Of these, the HDMI block 109 includes an input interface part 103, an output interface part 104, an audio switching part 105, a data storing part 106, a reproduction ability data part 107, and a control part 108. The input interface part 103, via the input terminal 101, retrieves video signals, audio signals, and other signals from signals that have been input from the source device 200. The output interface part 104 performs necessary conversion of video signals, audio signals, and other signals. The converted signals are output to the television 300 via the output terminal 102.

The audio switching part 105 converts and outputs input audio signals to any of an internal audio processing part 110 and the television 300 connected to the output terminal 102. The data storing part 106 saves data for indicating signal reproduction ability (described in detail later). The reproduction ability data part 107 saves data taking into consideration the signal reproduction ability of audio signals inherent to the AV amplifier 100, and "video signal transmission ability" of video signals. Here, the AV amplifier 100 itself does not perform video reproduction, but has a repeater function that transmits video signals of the source device 200 to the television 300 side, so it is necessary to consider the "video signal transmission ability" in the AV amplifier 100 as well.

The control part 108, as indicated by the arrows of the broken lines, is linked by wiring to each part within the HDMI block 109, and controls input/output and transmission of signals, saving of data that indicates reproduction ability, and the like. A line 121 is used for transmission of video signals, and a line 122 is used for transmission of audio signals. The audio switching part 105 is inserted midway in the audio signal line 122. Audio signals input from the source device 200 are brought inside the AV amplifier 100 by the audio switching part 105. Also, in this example, because there is no video signal output means in the AV amplifier 100, video signals are output to the television 300 side.

Of the above elements of the configuration, a signal input part of the invention is configured by the input terminal 101 and the input interface part 103. A signal output part of the invention is configured by the output terminal 102 and the output interface part 103.

Next is a description of the amplifier block 112. The amplifier block 112 includes the audio processing part 110 and a speaker output part 111. When audio signals output from the source device 200 are reproduced with the AV amplifier 100, the audio signals are supplied to the audio processing part 110 according to switching of the audio switching part 105. The audio processing part 110 performs various audio processing according to the reproduction ability of the AV amplifier 100 and selection by the user.

The audio processing includes 5.1 channel, two channel, or surround audio output, D/A conversion, and the like. Processed audio signals are input to the speaker output part 111, and here they are amplified in order to drive the speaker 400. Also, the audio signal output means of the invention is configured by the audio processing part 110 and the speaker output part 111.

The amplifier block 112 is configured such that the supply of power can be controlled separately from the HDMI block 109. The power supply 113 supplies power to the AV amplifier 100 as a whole. The power supply 113 is configured such that power is always supplied in a state of connection to a commercial power supply. A control switch 114 controls the power supplied to the amplifier block 112. A state in which the switch 114 has been closed is referred to as a "power supply on state", and in this state power is supplied from the power supply 113 to the HDMI block 109 and the amplifier block 112. On the other hand, a state in which the switch 114 has been opened so that power is not supplied to the amplifier block 112 is referred to as a "power supply standby state". That is, in the "power supply standby state", although power is not supplied to the amplifier block 112, power is supplied to the HDMI block 109.

FIG. 3 shows part of the internal configuration of the source device 200 connected to the input terminal 101 of the AV amplifier 100. The source device 200 includes a video/audio signal generating part 201, a video control part 202, an audio control part 203, an output interface part 204, an output terminal 205, and a control part 206. The video/audio signal generating part 201 includes an optical disk reproducing means or the like, and reproduces video signals and audio signals that have been recorded on a DVD, for example. The control part 206 is connected with a DDC line to the data storing part 106 of the AV amplifier 100 that has been connected to the output side, and is capable of reading out data that has been stored in the data storing part 106.

In the source device 200, the video control part 202 produces video signals in a format required by the television 300. The audio control part 203 produces audio signals in a format required by either of the AV amplifier 100 and the television 300. These formats can be confirmed by the control part 206, via the output terminal 205, reading out data that has been stored in the data storing part 106 of the AV amplifier 100. The output interface part 204 converts video signals produced by the video control part 202, audio signals produced by the audio control part 203, and other signals into signals necessary for HDMI transmission to a device connected to the output terminal 205. The control part 206, as indicated by the arrows of the broken lines, is linked by wiring to each part within the source device 200, and controls the operation of each of these parts. A line 221 is used for transmission of video signals, and a line 222 is used for transmission of audio signals.

Following is a list of the main functions of the source device 200. First, the source device 200 generates video signals and audio signals. Second, the source device 200, based on data that indicates the reproduction ability of video signals or audio signals and is saved in the data storing part 106, produces video signals or audio signals in a format required by a device connected to the output terminal 201, or performs conversion of signals to a format required by the device and outputs the converted signals.

FIG. 4 shows part of the internal configuration of the television 300 connected to the output terminal 102 of the AV amplifier 100. The television 300 includes an input terminal 301, an input interface part 302, a video/audio signal reproduction processing part 303, a data storing part 304, and a control part 305. The input interface part 302 retrieves video signals, audio signals, and other signals from signals that have been input via the input terminal 301. The video/audio signal reproduction processing part 303 performs necessary processing on video signals and audio signals that have been output from the input interface part 302. The data storing part 304 is connected with a DDC line to the control part 108 of the AV amplifier 100 that has been connected to the input side, and data that has been stored in the data storing part 304 can be read out by the control part 108.

The processed video signals and audio signals are output respectively to an unshown video monitor and internal speaker. The data storing part 304 stores data that indicates the reproduction ability of video signals and audio signals of the television 300. The control part 305, as indicated by the arrows of the broken lines, is linked by wiring to each part within the television 300, and controls the operation of each of these parts.

Figure 5:
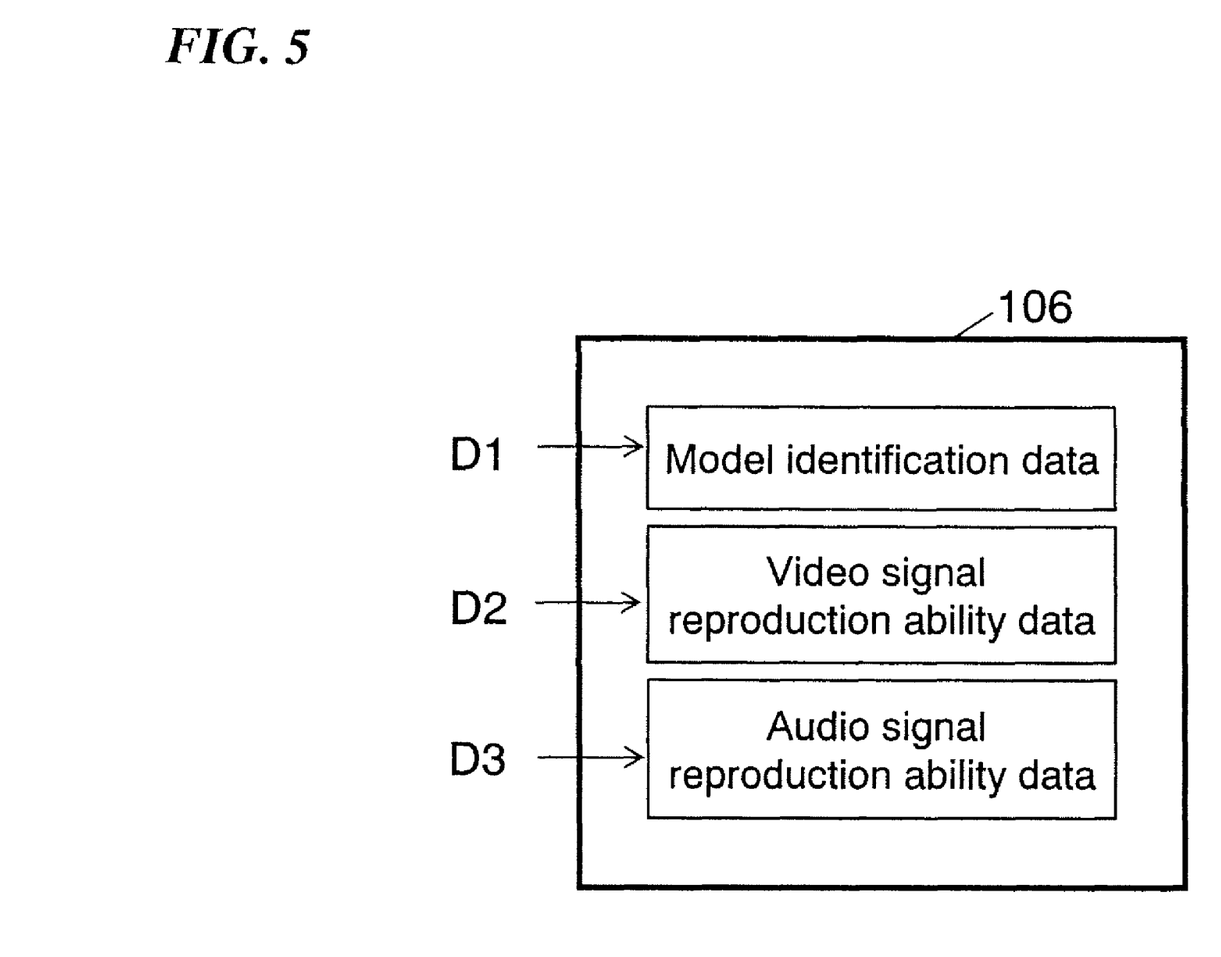
FIG. 5 is an explanatory diagram that shows an example of the data configuration of a data storing part of the AV amplifier in FIG. 1.

Next, FIG. 5 shows the contents of data that indicates the reproduction ability and is saved in the data storing part 106. Saved in the data storing part 106 is, as data that indicates reproduction ability, model identification data D1, video signal reproduction ability data D2, and audio signal reproduction ability data D3. Information of the device itself, and data for identifying the model of the device can also be saved as necessary. Here, the data that is saved is compliant with EDID (Extended Display Identification Data) specifications.

The data D2 that indicates the reproduction ability of video signals may include aspect ratio, analog, digital, digital high definition, and so on, and these items indicate the reproduction ability of the television 300. Also, the data D3 that indicates the reproduction ability of audio signals may include two channel, 5.1 channel, and so on, and these items indicate the reproduction ability of the television 300, and the AV amplifier 100 and the speaker 400. Note that the data saved in the data storing part 304 is like the data saved in the data storing part 106, and preferably is data compliant with EDID (Extended Display Identification Data) specifications.

Next is a description of the operation of the AV amplifier shown in FIG. 2. First is a description of operation in the "power supply on state" in which the power supply control switch 114 is closed, so that power is supplied to the amplifier block 112 from the power supply 113.

The control part 108 reads out data related to the inherent reproduction ability provided by the AV amplifier 100 itself, from the reproduction ability data part 107. Also, the control unit 108 reads out data that indicates the reproduction ability of the television 300 shown in FIG. 4 and is saved in the data storing part 304 of the television 300. The control part 108, from the two units of data read out, determines the contents of data that indicates the reproduction ability of the AV amplifier 100, and writes that data indicating the reproduction ability of video signals and the reproduction ability of audio signals to the data storing part 106.

In the "power supply on state" of the AV amplifier 100, the AV amplifier 100 is set such that audio is output from the external speaker 400 connected to the AV amplifier 100. Accordingly, the audio switching part 105 switches to the internal audio processing part 110 side of the amplifier block 112. As a result, audio signals transmitted from the source device 200 are not output to the television 300 side.

On the other hand, video signals transmitted from the source device 200 are set so as to be transmitted to the television 300 side. Accordingly, data that indicates reproduction ability and is saved in the data storing part 106 is data that indicates the reproduction ability of audio signals that the AV amplifier can output to the external speaker 400, and data that indicates the reproduction ability of video signals that the television 300 can output to a video monitor.

In the "power supply on state", the control part 206 of the source device 200 reads out data that indicates reproduction ability and is saved in the data storing part 106 of the AV amplifier 100, and controls the video control part 203 and the audio control part 204 based on this data. Specifically, based on an instruction from the control part 206, the video control part 202 produces video signals in a format necessary for reproduction with the television 300, based on video signals generated with the video/audio signal generation part 201. The audio control part 204 produces audio signals in a format necessary for reproduction with the AV amplifier 100, based on audio signals generated with the video/audio signal generation part 201.

In this manner, video signals and audio signals that have been set to a predetermined format are output to the AV amplifier 100 via the output terminal 205. Of the signals that have been input to the input interface part 103 via the input terminal 101 of the AV amplifier 100, the video signals are again output to the television 300 from the output interface part 104. On the other hand, audio signals are sent to the amplifier block 112 by the audio switching part 105, processed by the audio processing part 110 and the speaker output part 111, then output as audio from the speaker 400.

Next is a description of operation in the "power supply standby state", in which the power supply control switch 114 of the AV amplifier 100 is switched to open, so that power supply from the power supply 113 to the amplifier block 112 is cut off. In the "power supply standby state" the AV amplifier 100 cannot output audio from the external speaker 400. Thus, the audio switching part 105 switches output from the audio processing part 110 side to the output interface part 104 side. As a result, audio signals transmitted from the source device 200 are output to the television 300 via the output terminal 102.

In the "power supply standby state", although power is not supplied to the amplifier block 112, power is supplied from the power supply 113 to the HDMI block 109. At this time, the control part 108 ignores the data saved in the reproduction ability data part 107, and rewrites the audio signal reproduction ability data saved in the data storing part 106 to data that has been read out from the data storing part 304 of the television 300 and indicates the audio signal reproduction ability of the television 300.

The control part 206 of the source device 200 sets the format when reproducing video signals and audio signals based on the reproduction ability data saved in the data storing part 106 of the AV amplifier 100. The data that indicates the reproduction ability of video signals and audio signals, which is saved in the data storing part 106 of the AV amplifier 100 and confirmed by the source device 200, is data of the reproduction ability that is necessary for the television 300 to reproduce video signals and audio signals. Thus, in the source device 200, control is performed based on data that indicates the reproduction ability of the data storing part 303 on the television 300 side. That is, viewed from the source device 200 side, this is a state equivalent to a state in which the television 300 is directly connected, not the AV amplifier 100.

Also, in the above "power supply standby state", data obtained by rewriting data that indicates reproduction ability and is saved in the data storing part 106 to data that indicates the video signal reproduction ability of the television 300 is set so as to not exceed the video signal transmission ability of the AV amplifier 100 itself when transmitting video signals via the input interface 103 and the output interface 104.

Figure 6:
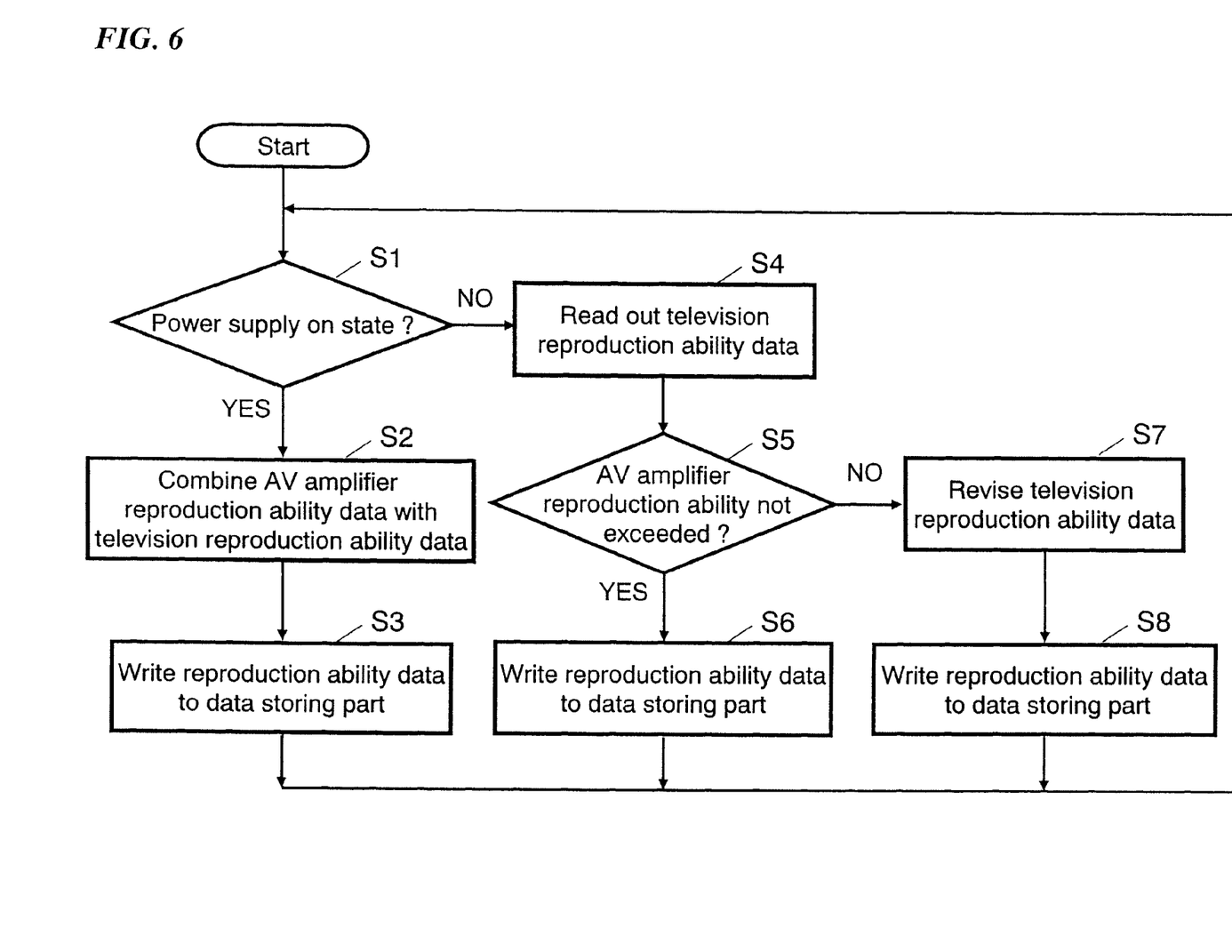
FIG. 6 is a flowchart that illustrates a process of writing data to the data storing part of the AV amplifier shown in FIG. 2.

Next is a description of processing when writing data to the data storing part 106, with reference to the flowchart in FIG. 6. In Step S1, the control part 108 of the AV amplifier 100 judges whether or not the AV amplifier 100 is in the "power supply on state". When judged that the AV amplifier 100 is in the "power supply on state", in Step S2, the control part 108 reads out both data that indicates the signal reproduction ability of the AV amplifier 100 itself and is saved in the data storing part 107 of the AV amplifier 100, and data that indicates the signal reproduction ability of the television 300 and is saved in the data storing part 304 of the television 300, and afterward combines this data. In Step S3, the control part 108 writes the data combined to the data storing part 106.

On the other hand, when judged in Step S1 that the AV amplifier 100 is not in the "power supply on state", but in an off state, i.e. in the "power supply standby state", in Step S4, the control part 108 reads out data that indicates the signal reproduction ability of the television 300 from the data storing part 304 of the television 300. In Step S5, the control part 108 judges whether or not the contents of the data do not exceed the video signal transmission ability of the AV amplifier 100 itself, and if judged to not exceed that ability, processing proceeds to Step S6, where that data is written as-is to the data storing part 106.

When, in Step S5, the contents of the television 300 signal reproduction ability data exceed the video signal transmission ability of the AV amplifier 100 itself, in Step S7, the control part 108 revises the data read out from the television 300 to be within a range that does not exceed the signal transmission ability of the AV amplifier 100 itself. In the following Step S8, the control part 108 writes the revised data to the data storing part 106.

In this manner, the format when reproducing video signals and audio signals of the source device 200 is set based on data that indicates reproduction ability and has been written to the data storing part 106. The video control part 202 and the audio control part 203 of the source device 200 output video signals and audio signals in the format that has been set. The video signals and audio signals that have been produced in this manner are input to the AV amplifier 100. Furthermore, the audio signals are output by the external speaker 400 connected to the AV amplifier 100, or output by the internal speaker of the television 300, according to the on/off (standby) state of the power supply of the AV amplifier 100. In either case, video signals are output to the television 300.

In the invention, as described above, when the power supply of the AV amplifier 100 is turned off and audio is output from the internal speaker of the television, such as when viewing/listening at night or the like, it is not necessary for the user to change the wiring connections between devices. Also, it is not necessary for the user to change the set format or the like on the source device side to match the reproduction ability of the device that will reproduce signals.

When the user wants to listen to audio with external speakers of the AV amplifier, suitable signals are reproduced. When the user does not need the AV amplifier, a state equivalent to a state in which the source device and the television are directly connected is established by placing the AV amplifier in the "power supply standby state". As a result, it is possible to operate in the same manner as in a system in which there are wiring connections between only the source device and the television, and thus it is possible to eliminate operations that are troublesome to the user.

Industrial Applicability

With the audiovisual system of the invention, it is possible to easily change conditions when outputting audio to correspond to various situations, such as when a user wants to enjoy powerful audio using an AV amplifier or when the user wants to reproduce audio with only a television such at night. Thus the audiovisual system of the invention has great applicability. In particular, the invention is useful in an audiovisual system in which apparatuses are connected with HDMI cables.

The invention claimed is:

1. A sound reproducing apparatus comprising:
    a signal receiver configured to receive an audio signal generated by an audio signal generating apparatus;
    a first signal transmitter configured to transmit the received audio signal to an audio output apparatus which is connected to the sound reproducing apparatus;
    a second signal transmitter configured to transmit the received audio signal to a speaker which is connected to the sound reproducing apparatus;
    a power supply unit configured (i) to provide power to the first signal transmitter in both a power stand-by state of the sound reproducing apparatus and a power-on state of the sound reproducing apparatus and (ii) to provide power to the second signal transmitter in the power-on state and to not provide power to the second signal transmitter in the power stand-by state;
    a data storage unit configured to store reproducibility information of the sound reproducing apparatus, the reproducibility information of the sound reproducing apparatus for being selectively used by the audio signal generating apparatus to generate the audio signal;
    a data obtaining unit configured to obtain reproducibility information of the audio output apparatus, the reproducibility information of the audio output apparatus being selectively used to generate the audio signal by the audio signal generating apparatus;
    a state switching unit configured to switch the sound reproducing apparatus between the power stand-by state or the power-on state;
    a control unit configured to switch output designations in response to the state switching unit switching the sound reproducing apparatus to one of the power stand-by state or the power-on state, independently of detection of any connection state of the sound reproducing apparatus with either the audio output apparatus or the speaker, and to select the reproducibility information of the sound reproducing apparatus or the audio output apparatus based on the output designation which the control unit switches to, to send the selected reproducibility information to the audio signal generating apparatus,
    wherein:
    if the output designation, to which the control unit switches, is the speaker, the control unit selects the reproducibility information of the sound reproducing apparatus to send to the audio signal generating apparatus, if the output designation, to which the control unit switches, is the audio output apparatus, the control unit selects the reproducibility information of the audio output apparatus to send to the audio signal generating apparatus, in response to the sound reproducing apparatus being switched by the state switching unit to the power stand-by state, the control unit switches the output designation to the audio output apparatus, and in response to the sound reproducing apparatus being switched by the state switching unit to the power-on state, the control unit switches the output designation to the speaker and controls the first signal transmitter to not provide the received audio signal to the audio output apparatus.

2. A sound reproducing apparatus comprising:

a signal receiver configured to receive an audio signal generated by an audio signal generating apparatus;

a first signal transmitter configured to transmit the received audio signal to a television which is connected to the sound reproducing apparatus;

a second signal transmitter configured to transmit the received audio signal to a speaker which is connected to the sound reproducing apparatus;

a power supply unit configured (i) to provide power to the first signal transmitter in both a power stand-by state of the sound reproducing apparatus and a power-on state of the sound reproducing apparatus and (ii) to provide power to the second signal transmitter in the power-on state and to not provide power to the second signal transmitter in the power stand-by state;

a data storage unit configured to store reproducibility information of the sound reproducing apparatus, the reproducibility information of the sound reproducing apparatus for being selectively used by the audio signal generating apparatus to generate the audio signal;

a data obtaining unit configured to obtain reproducibility information of the television, the reproducibility information of the television being selectively used to generate the audio signal by the audio signal generating apparatus;

a state switching unit configured to switch the sound reproducing apparatus between the power stand-by state and the power-on state;

a control unit configured to switch output designations in response to the state switching unit switching the sound reproducing apparatus to one of the power stand-by state or the power-on state, independently of detection of any connection state of the sound reproducing apparatus with either the television or the speaker, and to select the reproducibility information of the sound reproducing apparatus or the television based on the output designation which the control unit switches to, to send the selected reproducibility information to the audio signal generating apparatus, wherein:

in response to the sound reproducing apparatus being switched by the state switching unit to the power stand-by state, the control unit switches the output designation to the television, and in response to the sound reproducing apparatus being switched by the state switching unit to the power-on state, the control unit switches the output designation to the speaker, and controls the first signal transmitter to not transmit the received audio signal to the television.

* * * * *